United States Patent

Kaji et al.

[11] Patent Number: 5,312,203
[45] Date of Patent: May 17, 1994

[54] ENDLESS RUBBER BELT VULCANIZING APPARATUS

[75] Inventors: Shinichi Kaji; Hirotaka Hatai; Yoshio Morishita, all of Kobe, Japan

[73] Assignee: Bando Kagaku Kabushiki Kaisha, Kobe, Japan

[21] Appl. No.: 926,412

[22] Filed: Aug. 10, 1992

[30] Foreign Application Priority Data

Aug. 21, 1991 [JP] Japan .................. 3-235405

[51] Int. Cl.⁵ .................. B29C 35/02; B29D 29/00
[52] U.S. Cl. .................. 425/28.1; 425/40; 425/393
[58] Field of Search .................. 425/28.1, 39, 40, 42, 425/43, 50, 393

[56] References Cited

U.S. PATENT DOCUMENTS

| | | | |
|---|---|---|---|
| 2,324,991 | 7/1943 | Groncy | 425/43 |
| 2,583,085 | 1/1952 | Campbell | 425/43 |
| 2,671,244 | 3/1954 | Freedlander | 425/28.1 |
| 4,027,543 | 6/1977 | Johnston | 474/271 |
| 5,062,780 | 11/1991 | Nakagaki | 425/39 |
| 5,073,098 | 12/1991 | Mishima | 425/28.1 |

FOREIGN PATENT DOCUMENTS 2-60716  3/1990  Japan .

Primary Examiner—Jay H. Woo
Assistant Examiner—James P. Mackey
Attorney, Agent, or Firm—Marshall, O'Toole, Gerstein, Murray & Borun

[57] ABSTRACT

Vulcanizing apparatus including a sealable vulcanizing vessel having an access cover on the top thereof, and a mold to be inserted in the vulcanizing vessel. The length of a rubber sleeve provided to cover the unvulcanized rubber belt molding A formed over the external circumference of the mold is sized a little longer than the height of the mold so that both ends of the rubber sleeve when placed in covering position protrude slightly from both the top and bottom ends of the mold. A holding seat is provided in the lower part of the vulcanizing vessel, and a pressing seat corresponding to the holding seat is provided on the access cover via a cylinder unit so that the pressing seat can be extended and retracted as required. The inner structures of both the pressing seat and holding seat include cooling jackets.

2 Claims, 4 Drawing Sheets

ENDLESS RUBBER BELT VULCANIZING APPARATUS

FIELD AND BACKGROUND OF THE INVENTION

The present invention relates to vulcanizing apparatus for vulcanizing endless rubber belts such as power transmission rubber belts.

Endless rubber belts of this type are produced by winding belt constituent members, including unvulcanized rubber sheet, canvas, cords, etc., over the outer circumference of a mold to form a cylindrical unvulcanized rubber slab, vulcanizing, cooling and removing the cylindrical rubber and slicing the slab into belts of a desired width.

One typical vulcanizing apparatus for vulcanizing an unvulcanized rubber belt form is the gasket vulcanizing apparatus, and a cross sectional view of one portion of the apparatus is shown in FIG. 6. Ring-shaped capping members 52 and 53 are fixed to both the upper and bottom ends of a mold 51 in such a way that the capping members cover both the upper and bottom ends of an unvulcanized rubber belt molding A formed over the outer circumference of the mold 51 between the members 52 and 53. Then the whole assembly is inserted into a metal sleeve 55. The metal sleeve 55 has a rubber sleeve 54 of which both the top and bottom ends are fixed to the inner circumference of the metal sleeve 55. Pressurized steam is introduced through a pipe into the space between the rubber sleeve 54 and the metal sleeve 55 to apply pressure on the molding A and heat it to effect vulcanization. The above-mentioned vulcanizing apparatus is placed inside a sealable vulcanizing vessel (not illustrated) and the pressurized steam is introduced inside the vulcanizing vessel. An apparatus similar to that described above is disclosed, for example, in U.S. Pat. No. 4,095,480.

The above-mentioned conventional vulcanizing apparatus, however, has room for further improvements on the following points:

(1) In the vulcanizing operation, capping members 52 and 53 must be selected according to the size of the mold 51 and the thickness of the unvulcanized rubber belt molding A. Replacement of the capping members for each size takes time and labor.

(2) The second point relates to the vulcanized product. The capping members 52 and 53 are made of metal, and these members are quickly heated up upon the introduction of the pressurized steam. As a result, the upper and lower portions X (see FIG. 5 (b)) of the unvulcanized rubber belt molding A have a greater vulcanizing speed relative to other portions (Y and Z), as shown by the curve X' in FIG. 5 (a) which indicates the states of vulcanization, and become overcured. The upper and lower portions X of the unvulcanized rubber belt molding A will shrink and prevent the gas released by the rubber belt molding A from escaping. Then the gas will remain in the form of bubbles which in turn may produce pin holes or deteriorate the quality of the rubber belt.

Moreover, there is a gap between the mold 51 and the capping members 52 and 53. During the vulcanization a part of the unvulcanized rubber belt molding A will melt and flow into the gap. As a result, the top and bottom portions of the rubber belt must be wasted since the form of these portions is irregular. The yield, therefore, is reduced.

SUMMARY OF THE INVENTION

It is a general object of the present invention to provide a vulcanizing apparatus for endless rubber belt, which has the following features: the above-mentioned capping members are not required; a change of setup is not needed for a change in the rubber belt size; the vulcanization operation is easier; the rubber belt quality is improved; and the yield is higher.

To achieve the above-mentioned objective, the vulcanizing apparatus of the present invention a) comprises a sealable vulcanizing vessel having an access cover on the top thereof, a mold to be inserted in the vulcanizing vessel, and a steam supply and exhaust piping capable of supplying and exhausting steam to and from the space around the mold in the vulcanizing apparatus and the inner space of the mold, b) the length of the rubber sleeve to cover the unvulcanized rubber belt molding formed over the external circumference of the mold is set a little longer than the height of the mold so that both ends of the rubber sleeve when placed in covering position protrude a little from both the top and bottom ends of the mold, c) a ring-shaped holding seat is provided in the lower part of the vulcanizing vessel to place the mold thereon, and a ring-shaped pressing seat corresponding to the holding seat is provided on the inner surface of the access cover via an extending means such as a cylinder unit so that the pressing seat can be extended and retracted as required, and d) the inner structure of the pressing seat comprises a cooling jacket so that a cooling medium is circulated inside the pressing seat.

Moreover, it is desirable that the inner structure of the holding seat also comprises the cooling jacket so that the cooling medium is circulated inside the holding seat.

In the vulcanizing apparatus of this invention having the above-mentioned composition, the access cover is opened to insert a rubber belt molding formed over the outer circumference of a mold, said rubber belt molding being covered by or sheathed in a rubber sleeve, into the vulcanizing vessel. The mold is placed on the holding seat, and the access cover is closed to seal up the vessel. The extending means is extended so that the pressing seat forces the top end of the mold down, and thus the mold is fixed between both the pressing seat and the holding seat. In this state, the projecting portions of both the upper and lower ends of the rubber sleeve closely contact the pressing seat and the holding seat, respectively. Then the cooling medium is introduced and circulated in the cooling jacket inside the pressing seat, and at the same time, the pressurized steam is introduced into the vulcanizing vessel and the mold to vulcanize the unvulcanized rubber belt molding.

In this way, the unvulcanized rubber belt molding is vulcanized while at least its upper end portion is cooled. As a result, as shown in FIG. 5 (a) indicating the degree of vulcanization, the vulcanizing speed of the upper end portion X does not differ much from those of other portions Y and Z. The gas released from the unvulcanized rubber belt molding escapes between the top end portion of the rubber belt molding and the mold or between the molding and the rubber sleeve. Thus the formation of pin holes or other defects is prevented. Both the top and bottom ends of the unvulcanized rubber belt molding are vulcanized while being closely surrounded by the mold, rubber sleeve and pressing seat or holding seat. Thus the form of the product will not be damaged even if the unvulcanized rubber belt molding melts during vulcanization.

When the vulcanizing apparatus is used, the lower end of the unvulcanized rubber belt molding is vulcanized while being cooled just like the upper end by introducing the cooling medium into the cooling jacket inside the supporting seat. As shown in FIG. 5 (a) indicating the degree of vulcanization, the vulcanizing speed of the lower end portion X is similar to those of other portions Y and Z. Thus the entire unvulcanized rubber belt molding is evenly vulcanized.

BRIEF DESCRIPTION OF THE DRAWINGS

FIG. 4 (b) is a longitudinal section showing the lefthand half of the mold fixed in the vulcanizing apparatus;

FIG. 5 (b) is a diagram illustrating the positions of the portions X, Y and Z of the unvulcanized rubber belt molding A.

DETAILED DESCRIPTION OF THE INVENTION

A preferred embodiment of the vulcanizing apparatus for endless rubber belts according to the present invention is described as follows with reference to the attached drawings.

Figure 1:
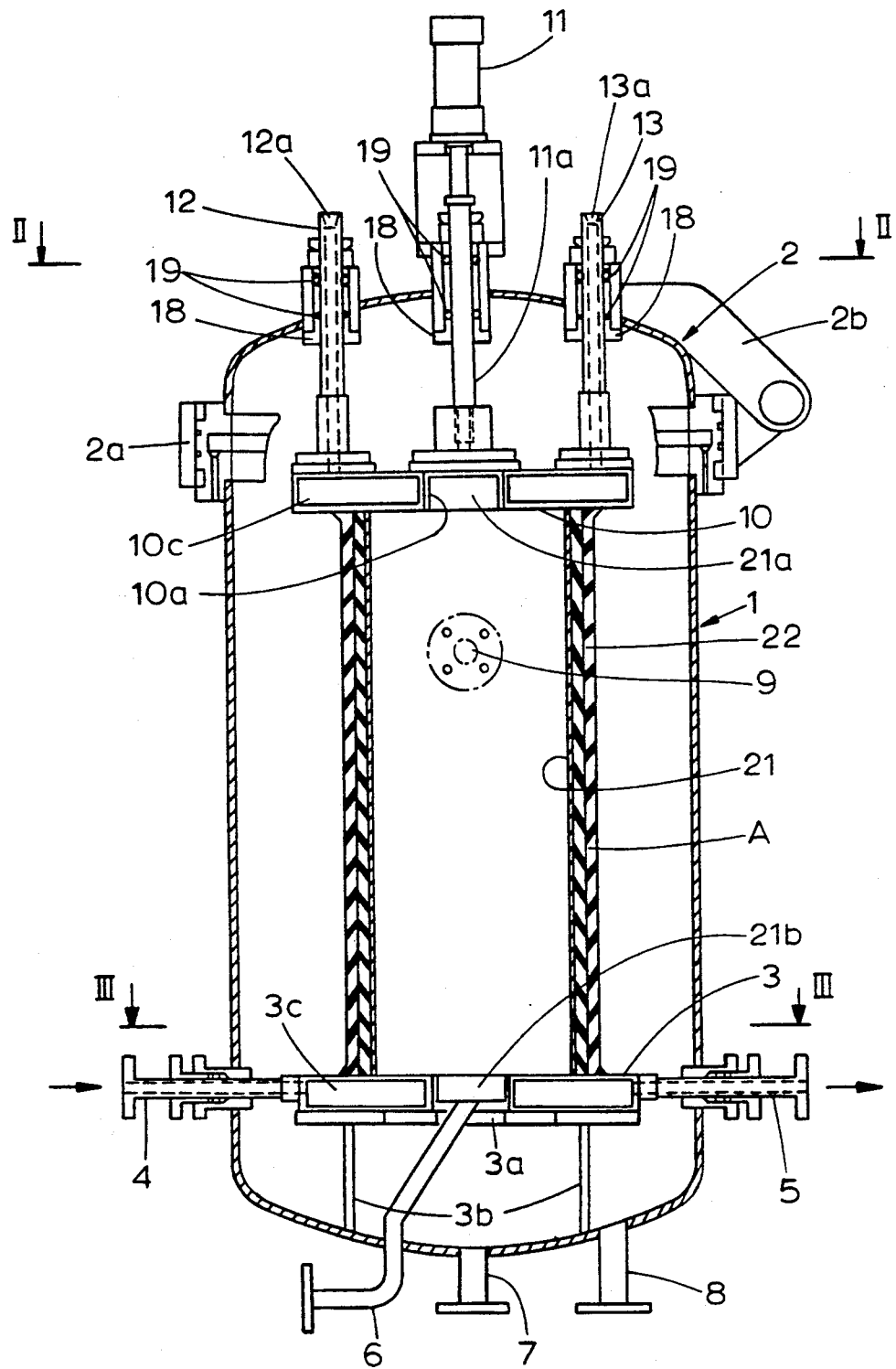
FIG. 1 is a longitudinal sectional view of a preferred embodiment of a vulcanizing apparatus according to the present invention.
Figure 2:
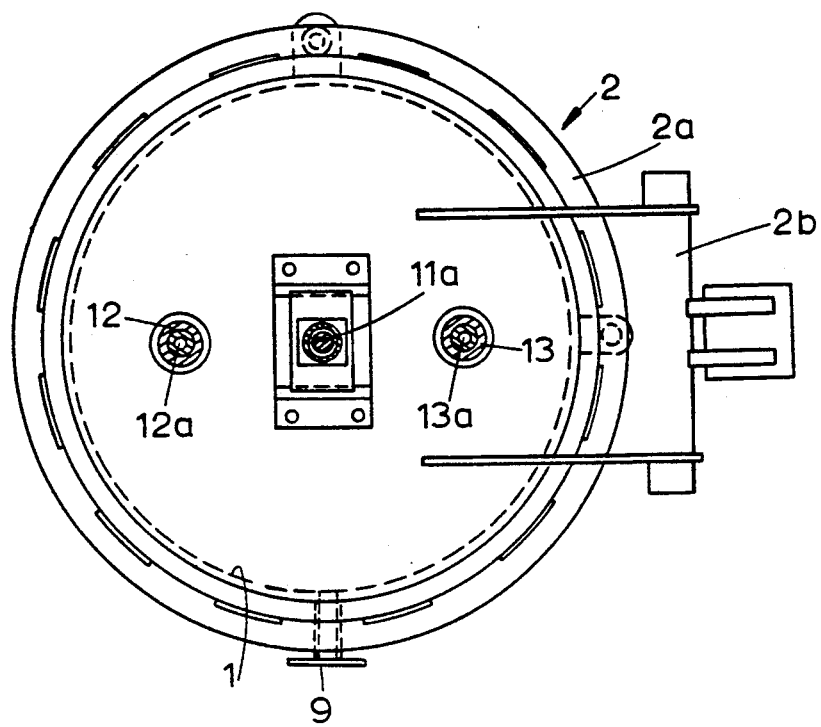
FIG. 2 is a cross sectional view of the apparatus along the line II—II of FIG. 1.

With reference to FIG. 1, a vulcanizing vessel 1 is provided with an access cover 2 on the top thereof. The access cover 2 is provided, as shown in FIG. 2, with a sealing ring 2a around the circumference thereof, and is connected to the vulcanizing vessel 1 by means of a hinge 2b.

Figure 3:
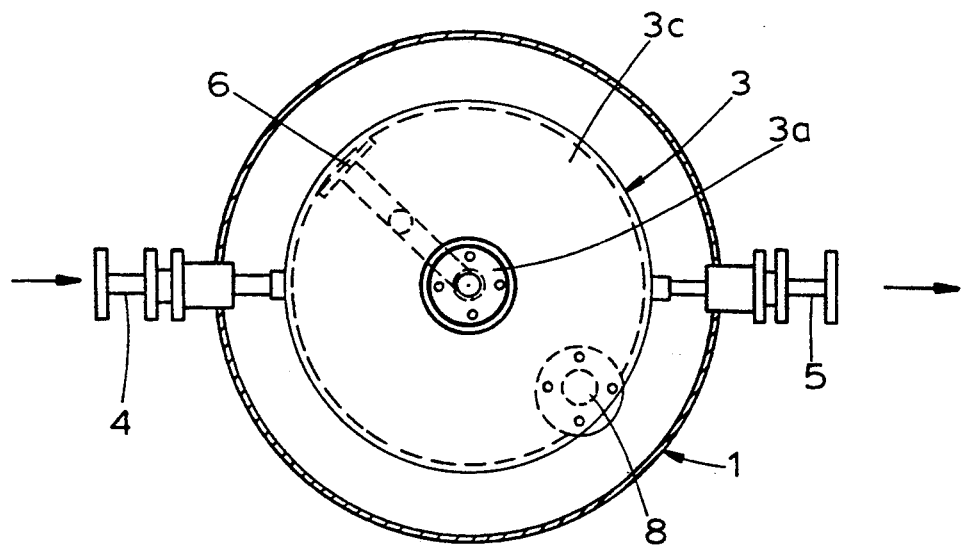
FIG. 3 is a sectional view along the line III—III of FIG. 3.

Inside the vulcanizing vessel 1, as best shown in FIG. 3, a ring-shaped holding seat 3 having an opening 3a in the center thereof is secured to the bottom via a cylindrical supporting member 3b.

As shown in FIG. 1, the holding seat 3 comprises a cooling jacket 3c. A cooling water supply pipe 4 and a cooling water drain pipe 5 both penetrating through the circumferential wall of the vulcanizing vessel 1 are connected to the cooling jacket 3c. In the lower part of the vulcanizing vessel 1, one end of a low pressure steam supply pipe 6 penetrating through the bottom wall thereof is extended to the opening 3a of the holding seat 3. Moreover, a low pressure steam exhaust pipe 7 is connected to the center of the bottom wall of the vessel, and a high pressure steam exhaust pipe 8 is connected to the periphery of the bottom wall of the vessel 1. Furthermore, a high pressure steam supply pipe 9 is connected to the upper circumferential wall of the vulcanizing vessel 1.

On the inner face of the access cover 2, a pressing seat 10 is provided via a hydraulic cylinder 11 so that the pressing seat 10 can be freely extended and retracted. The pressing seat 10 comprises a ring having an opening 10a in the center thereof, and is symmetrical with the holding seat 3. The internal structure of the pressing seat 10 comprises a cooling jacket 10c, and is fixed to the top end of the cylinder rod 11a of the hydraulic cylinder 11 provided through the center of the access cover 2. A pair of guiding members 12 and 13 are provided through the access cover 2, similar to the hydraulic cylinder 11, with the cylinder rod 11a between the members 12 and 13. The bottom ends of the guiding members 12 and 13 are fixed to the pressing seat 10, respectively. The shafts of the guiding members 12 and 13 are provided with through holes 12a and 13a, respectively, and these holes are Connected through to the cooling jacket 10c. The guiding member 12 forms the supply pipe of the cooling water, and the other guiding member 13 forms the drain pipe of the cooling water.

Figure 4A:
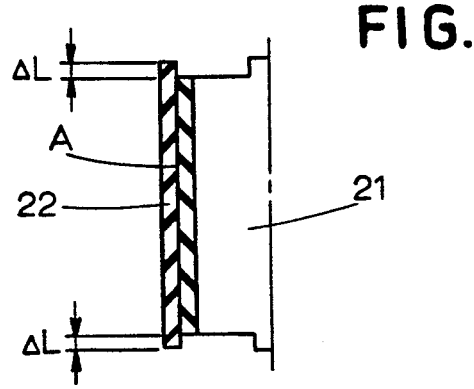
FIG. 4 (a) is a longitudinal section showing the lefthand half of an unvulcanized rubber belt molding on the outer circumference of the mold, with the molding sheathed in the rubber sleeve.
Figure 4B:
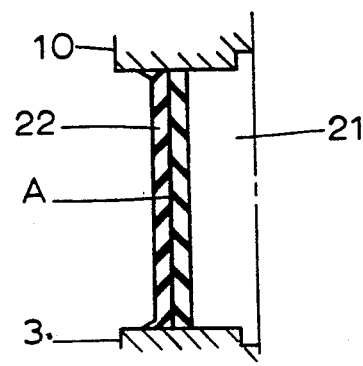

A mold 21 to be mounted in the vulcanizing vessel 1 having the above-mentioned configuration comprises a cylindrical body provided with openings 21a and 21b in the centers of the top and bottom ends, respectively. An unvulcanized rubber sheet, canvas, cords, etc. are wound sequentially over the exterior circumference of the mold 21, prior to mounting the mold in the apparatus, to form an unvulcanized rubber belt molding A. A heat-resistant rubber sleeve 22 is placed over the circumference of the rubber belt molding A. The length of the rubber sleeve 22 is made a little longer than the height of the mold 21 so that both ends of the rubber sleeve 22, when the sleeve is placed over the molding A as shown in FIG. 4 (a), protrude a little from the top and bottom ends of the mold 21. Accordingly, when the mold 21 is secured between the holding seat 3 and the pressing seat 10, the ends of the rubber sleeve 22 are deformed or bulged outwardly in the radial direction as shown in FIG. 4 (b) to closely contact the holding seat 3 and the pressing seat 10, respectively. In FIG. 1, the numeral 18 denotes a gasket packing, and the numeral 19 an O-ring.

The condition of vulcanization achieved by the embodiment of the vulcanizing apparatus of the abovementioned configuration is described as follows. The rubber sleeve 22 is placed over the unvulcanized rubber belt molding A formed over the exterior circumference of the mold 21 as shown in FIG. 4 (a). With reference to FIG. 1, the access cover 2 of the vulcanizing vessel 1 is opened, and the mold 21 is inserted into the vessel 1. The mold 21 is placed on the holding seat 3, and the access cover 2 is closed to seal up the vulcanizing vessel 1. In this condition, the hydraulic cylinder 11 is extended to lower and press the pressing seat 10 against the top end of the mold 21. Thus the mold 21 is fixed in place. Both the top and bottom ends of the rubber sleeve 22 are deformed as shown in FIG. 4 (b) to closely contact the holding seat 3 and the pressing seat 10.

Figure 5A:
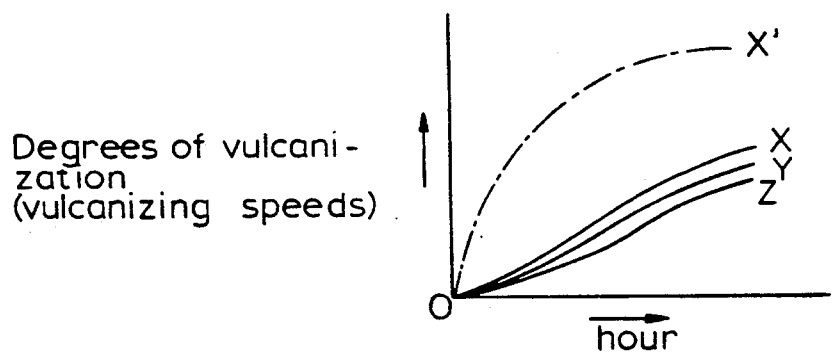
FIG. 5 (a) is a chart indicating the relationship between the degree of vulcanization (vulcanizing speed) and the time of portions X, Y and Z of an unvulcanized rubber belt molding.
Figure 5B:
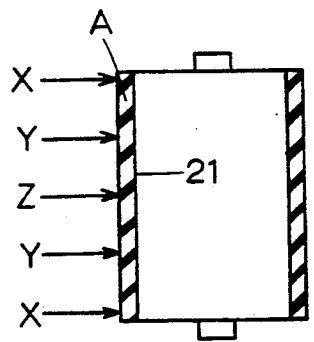
Figure 6:
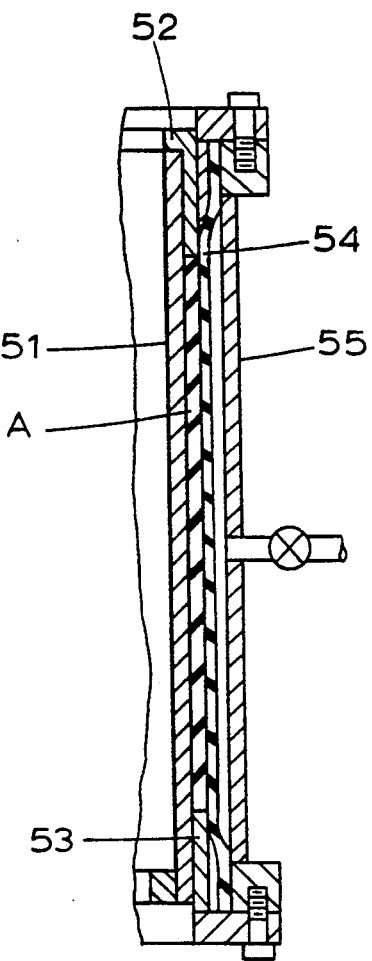
FIG. 6 is a longitudinal sectional view showing a portion of a prior art gasket vulcanizing apparatus.

Then the cooling water is introduced from the supply pipes 4 and 12 into the cooling jackets 3c and 10c. The low pressure steam is guided into the mold 21 from the low pressure steam supply pipe 6, and the high pressure steam is guided to the space around the mold 21 in the vulcanizing vessel 1 through the high pressure steam supply pipe 9. In this way, the rubber belt A is vulcanized while both the top and bottom ends of the unvulcanized rubber belt molding A are cooled. As a result, the degrees of vulcanization (vulcanizing speeds) at the respective portions X, Y, and Z of the unvulcanized rubber belt molding A indicated in FIG. 5 (b) are nearly equalized as shown in FIG. 5 (a), and the entire rubber belt molding A is evenly vulcanized. Moreover, in contrast with the vulcanization in the conventional gasket vulcanizing apparatus shown in FIG. 6, both the top and bottom ends of the unvulcanized rubber belt molding A are not overcured (earlier contraction), the gas generated during the vulcanization (in particular, immediately after the start of the vulcanization) can be released from the rubber belt molding A; thus defects such as pin holes can be prevented and a rubber belt of a good quality can be produced.

After the passage of a specified time, the vulcanization process is completed. The supplies of the cooling water, low pressure steam and high pressure steam are terminated simultaneously. Then the pressing seat 10 is raised by the hydraulic cylinder 11 to release the mold 21. The access cover 2 is opened and the mold 21 is taken out to complete the steps of the vulcanization process.

In the above-mentioned embodiment, the interior of the holding seat 3 comprises a cooling jacket 3c. It, however, should be noted that the gas generated from the rubber belt molding A during vulcanization can be released from the top when the cooling jacket is provided on the pressing seat 10 side only; thus a rubber belt of high quality with virtually no pin holes can be produced by this vulcanization apparatus. Moreover, the vertical movement of the pressing seat 10 is effected by the hydraulic cylinder 11, but the invention is not limited to this arrangement. For instance, a feed screw mechanism powered by a driving motor may be used.

As will be clear from the foregoing description, the invention has the following advantages or effects:

(1) Since no capping members are needed, a change of the setup is not required for a change in the size of the rubber belt molding. Hence the vulcanization operation is simpler and the efficiency is higher.

(2) The entire cylindrical unvulcanized rubber belt molding is evenly vulcanized without occurrence of any pin holes. Thus the quality of the rubber belt is improved.

(3) Both the top and bottom ends of the cylindrical unvulcanized rubber belt molding can be used to produce products. Hence at least two more rubber belts can be produced for each rubber belt molding in comparison with the conventional vulcanizing apparatus. Thus the yield is higher.

What is claimed is:

1. A vulcanizing apparatus for an endless molding used in the manufacture of endless rubber belts, said vulcanizing apparatus comprising a sealable vulcanizing vessel having an access cover on one end thereof, a mold for insertion into the vulcanizing vessel, said mold having a length and an interior space and an external circumference, a steam supply and exhaust piping connected to said vulcanizing vessel for supplying and exhausting steam to and from a space around said mold in the vulcanizing vessel and the interior space of said mold, a rubber sleeve having a length to cover said molding which is formed over the external circumference of said mold, said sleeve being longer than the length of said mold so that both ends of said sleeve when placed in covering position on said molding protrude from both ends of said mold, a ring-shaped holding seat provided int eh lower part of said vulcanizing vessel and one end of said mold being positioned on said holding seat, said access cover having an inner surface and a ring-shaped pressing seat provided on said inner surface of said access cover and engaging the other end of said mold and said sleeve, extending means connected to said access cover and said pressing seat such that said pressing seat can be extended and retracted as required, and the interior of said pressing seat comprises a cooling jacket for a cooling medium which is circulated inside said pressing seat.

2. A vulcanizing apparatus as set forth in claim 1, wherein the interior of said holding seat comprises a cooling jacket for a cooling medium which is circulated therein.

* * * * *

UNITED STATES PATENT AND TRADEMARK OFFICE
CERTIFICATE OF CORRECTION

PATENT NO. : 5,312,203

DATED : May 17, 1994

INVENTOR(S) : Shinichi KAJI et al.

It is certified that error appears in the above-identified patent and that said Letters Patent is hereby corrected as shown below:

Column 6, line 27, "int eh" should be --in the--.

Column 4, lines 51 and 66, "l" should be --1--.

Signed and Sealed this

Twentieth Day of September, 1994

Attest:

BRUCE LEHMAN

Attesting Officer

Commissioner of Patents and Trademarks